United States Patent [19]

Dillmann

[11] Patent Number: 5,075,073
[45] Date of Patent: Dec. 24, 1991

[54] FOREIGN OBJECT SEPARATOR FOR A REACTOR COOLING SYSTEM

[75] Inventor: Charles W. Dillmann, Morgan Hill, Calif.

[73] Assignee: General Electric Company, San Jose, Calif.

[21] Appl. No.: 649,523

[22] Filed: Feb. 1, 1991

[51] Int. Cl.$^5$ .............................................. G21C 1/04
[52] U.S. Cl. ................................... 376/352; 376/395; 376/310; 376/316; 376/399; 376/461
[58] Field of Search ............... 376/313, 352, 316, 310, 376/307, 395, 399, 461; 15/1

[56] References Cited

U.S. PATENT DOCUMENTS

| | | | |
|---|---|---|---|
| 4,062,724 | 12/1977 | Broadley | 376/280 |
| 4,243,485 | 1/1981 | Chabin | 376/313 |
| 4,634,525 | 1/1987 | Yant | 210/171 |
| 4,657,730 | 4/1987 | Blaushild et al. | 376/285 |
| 4,716,012 | 12/1987 | Gasparro et al. | 376/352 |

FOREIGN PATENT DOCUMENTS

0205162 12/1986 European Pat. Off. .

OTHER PUBLICATIONS

D. R. Wilkins et al., "Advanced BWR: Design Improvements Build on Proven Technology", *Nuclear Engineering International*, reprint of Jun. 1986; cover, pp. 1-7, and drawing labelled The World's Reactors No. 89.

Primary Examiner—Brooks H. Hunt
Assistant Examiner—Meena Chelliah
Attorney, Agent, or Firm—Robert R. Schroeder

[57] ABSTRACT

A nuclear reactor includes a spaced sidewall and a core shroud defining a flow passage for channeling a coolant. A foreign object separator includes an arcuate endwall extending from the sidewall, with the core shroud including an intermediate portion spaced from the endwall to define an annular inlet for receiving coolant from the flow passage. The core shroud also includes a distal end spaced from the endwall to define a throat. A separator member has a proximal end joined to the endwall, and a distal end spaced from the core shroud to define an outlet. The distal end of the separator is spaced from its proximal end for allowing the coolant from the throat to impinge against the separator member for turning the coolant prior to discharge from the outlet and using centrifugal force to separate any foreign objects of predetermined size from the coolant. The separated foreign objects are retained adjacent to the separator member proximal end.

11 Claims, 3 Drawing Sheets

5,075,073

FOREIGN OBJECT SEPARATOR FOR A REACTOR COOLING SYSTEM

TECHNICAL FIELD

The present invention relates generally to nuclear reactors, and, more specifically, to a foreign object separator for a reactor cooling system.

BACKGROUND ART

In a typical nuclear reactor, a coolant, such as water, is circulated in the reactor for providing cooling of the various components therein. Foreign objects, such as, for example, loose or broken parts and other debris, may occasionally be found in the coolant. Such foreign objects may result in partial blockage of the coolant being circulated within the reactor or may cause wear damage to components therein which are impacted by the foreign objects. Any such damage from the foreign objects may result in increased maintenance expense, lost revenue due to unproductive down time of the reactor, and replacement costs for any fuel damaged by the foreign objects.

OBJECTS OF THE INVENTION

Accordingly, one object of the present invention is to provide a foreign object separator for a nuclear reactor cooling system.

Another object of the present invention is to provide a reactor cooling system foreign object separator effective for capturing foreign objects of a predetermined size.

Another object of the present invention is to provide a reactor cooling system foreign object separator which reduces blockage of coolant flow and wear damage from foreign objects entrained in the coolant flow.

DISCLOSURE OF INVENTION

A nuclear reactor includes a spaced sidewall and a core shroud defining a flow passage for channeling a coolant. A foreign object separator includes an arcuate endwall extending from the sidewall, with the core shroud including an intermediate portion spaced from the endwall to define an annular inlet for receiving coolant from the flow passage. The core shroud also includes a distal end spaced from the endwall to define a throat. A separator member has a proximal end joined to the endwall, and a distal end spaced from the core shroud to define an outlet. The distal end of the separator is spaced from its proximal end for allowing the coolant from the throat to impinge against the separator member for turning the coolant prior to discharge from the outlet and using centrifugal force to separate any foreign objects of predetermined size from the coolant. The separated foreign objects are retained adjacent to the separator member proximal end.

BRIEF DESCRIPTION OF DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

MODE(S) FOR CARRYING OUT THE INVENTION

Figure 1:
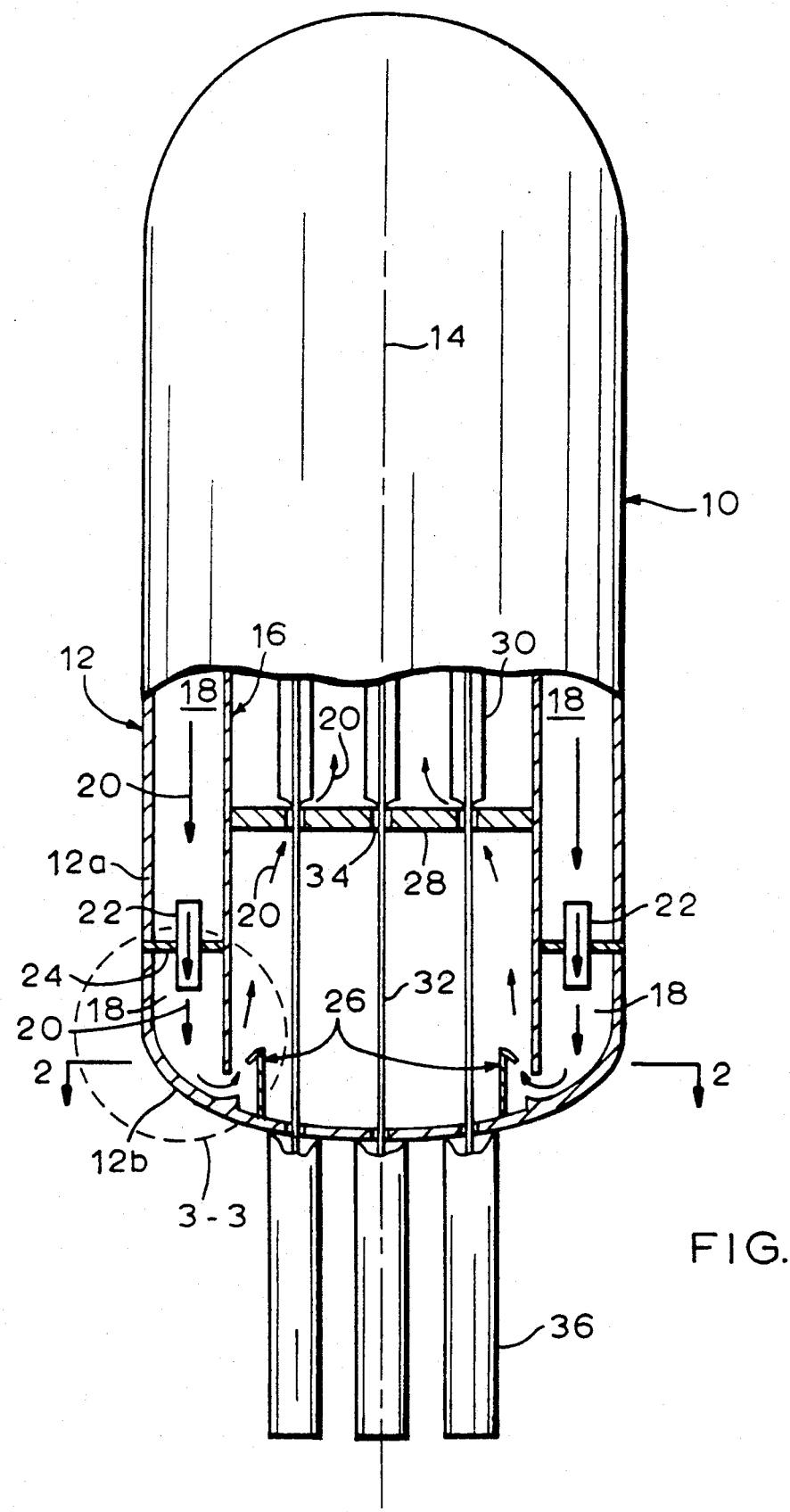
FIG. 1 is a schematic representation of a reactor assembly shown in longitudinal section, including a foreign object separator in accordance with one embodiment of the present invention.

Illustrated in FIG. 1 is a schematic, longitudinal sectional representation of a boiling water reactor assembly 10. The reactor assembly 10 includes a conventional pressure vessel 12 defined in part by an annular vessel sidewall 12a disposed coaxially about a longitudinal centerline axis 14 of the reactor assembly 10. The pressure vessel 12 also includes an integral, annular, bottom endwall 12b disposed coaxially about the centerline axis 14. Disposed inside the vessel 12 is a conventional, annular, or cylindrical core shroud 16 disposed coaxially about the centerline axis 14. The vessel sidewall 12a is spaced radially outwardly from the core shroud 16 to define an annular flow passage 18 for channeling a coolant 20, such as water, in a direction parallel to the centerline axis.

The coolant 20 is circulated through the flow passage 18 by a plurality of circumferentially spaced, conventional pumps 22 suitably joined to an annular pump deck 24 which is fixedly joined between the vessel sidewall 12a and the core shroud 16 at the bottom end of the pressure vessel 12. In this exemplary embodiment, the pumps 22 are effective for pumping the coolant 20 from the flow passage 18 above the pump deck 24, and through the pump deck 24 in a downward direction for increasing the flowrate of the coolant 20 as it is channeled in the flow passage 18 below the pump deck 24.

The coolant 20 is channeled through a foreign object separator, designated generally at 26, in accordance with the present invention, and then inside the core shroud 16. The separator 26 reverses the direction of the coolant 20 from a downward direction outside the core shroud 16 to an upward direction inside the core shroud 16 toward a conventional annular core plate 28. The core plate 28 supports on its upper surface a plurality of conventional fuel bundles 30. A plurality of conventional control rods 32 extend from the endwall 12b and through apertures 34 of the core plate 28 and into the fuel bundles 30 for controlling the nuclear reaction therein. The control rods 32 are inserted and withdrawn within the fuel bundles 30 by a plurality of conventional control rod drives 36 joined to the outside of the end wall 12b. In the exemplary embodiment of the reactor assembly 10, there are 205 control rod drives 36, and respective control rods 32 and fuel bundles 30, with only 3 of which being shown in FIG. 1 for illustration purposes.

The coolant 20 is suitably channeled through the core plate apertures 34 for conventionally cooling the fuel bundles 30 as well as other components located downstream of the core plate 28. Any foreign objects contained in the coolant 20, such as for example, loose or broken parts, may find their way through the core plate 28 and to the fuel bundles 30. The foreign objects may cause early wear of the fuel bundles 30 or damage to the control rods 32 and, therefore, the foreign object separator 26 in accordance with the present invention is provided for separating from the coolant 20 any foreign objects contained therein having a predetermined size.

Figure 2:
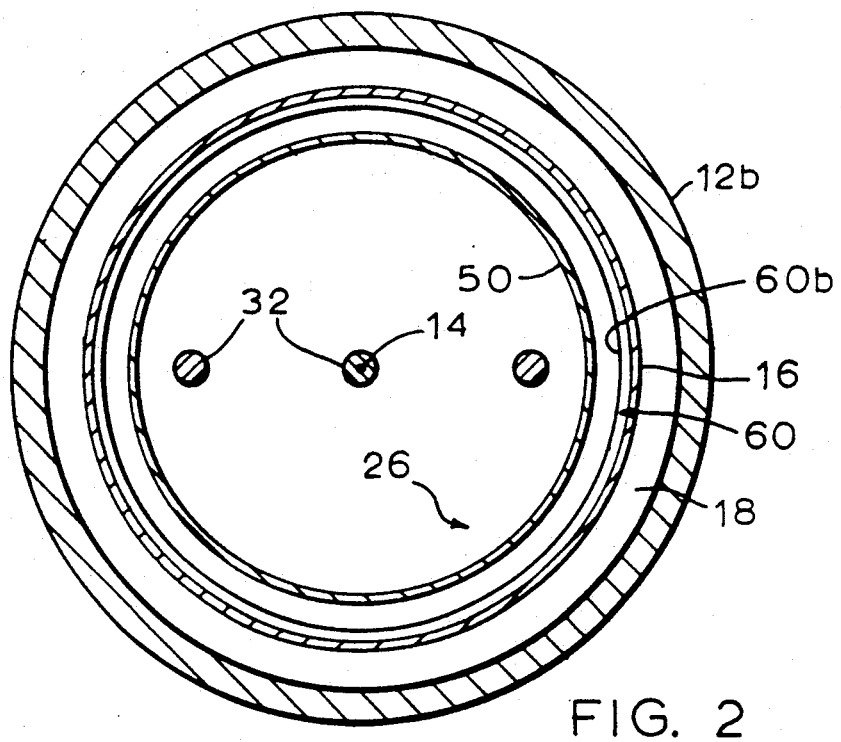
FIG. 2 is a transverse sectional view of the foreign object separator illustrated in FIG. 1 taken along line 2—2.
Figure 3:
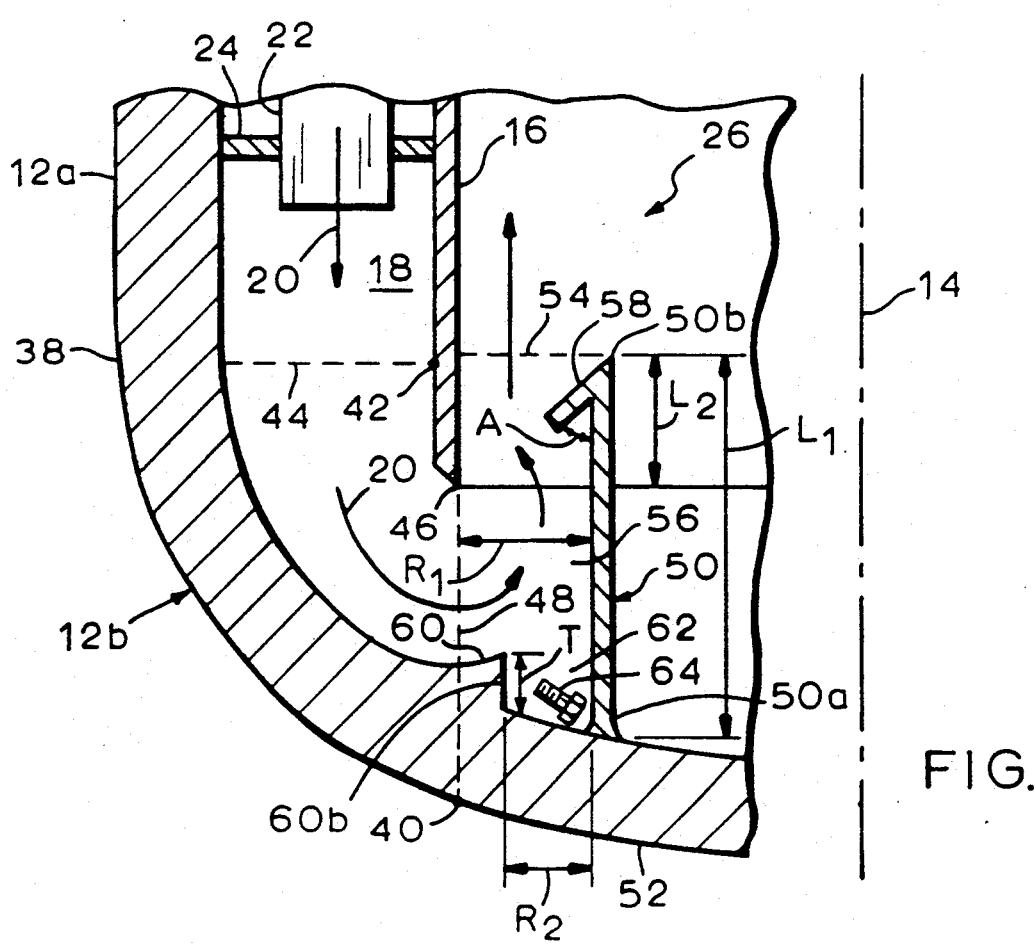
FIG. 3 is an enlarged view of a portion of the foreign object separator illustrated in FIG. 1 taken within the dashed circle labeled 3—3.

The foreign object separator 26 is illustrated in more particularity in FIGS. 2 and 3. The separator 26 includes the vessel endwall 12b being arcuate in a longitudinal plane extending through the centerline axis 14 as illustrated in more particularity in FIG. 3. The endwall 12b is arcuate from a first portion 38, joined to the vessel sidewall 12a, to a second portion 40 spaced radially inwardly from and longitudinally downwardly from the first portion 38 for turning radially inwardly the coolant 20. The core shroud 16 includes an intermediate portion 42 spaced radially inwardly from the endwall first portion 38 to define therewith an annular inlet 44 for receiving the coolant 20 from the flow passage 18. The core shroud 16 also includes a distal end 46 spaced longitudinally downwardly from the intermediate portion 42 and longitudinally upwardly from the endwall second portion 40 to define therewith an annular throat 48.

The separator 26 further includes an annular, preferably cylindrical, separator member 50 disposed coaxially about the centerline axis 14 and having a proximal end 50a fixedly joined to a third portion 52 of the endwall 12b spaced radially inwardly from the endwall second portion 40. The separator member 50 also includes a distal end 50b spaced radially inwardly from the core shroud distal end 46 to define an annular outlet 54. The separator distal end 50b is predeterminedly spaced longitudinally upwardly at a first distance $L_1$ from the separator member proximal end 50a for allowing the coolant 20 from the throat 48 to impinge against the separator member 50 for further turning the coolant 20 prior to discharge from the outlet 54. The arcuate endwall 12b and the separator member 50 thereby cause centrifugal force to separate foreign objects of predetermined size from the turning coolant 20, and be swept against the endwall 12b. The foreign objects then contact the separator member 50 and fall to the bottom by gravity to be retained adjacent to the separator member proximal end 50a.

More specifically, the separator member 50 as illustrated in FIG. 3 is predeterminedly spaced radially inwardly from the core shroud 16 at a distance $R_1$, and extends predeterminedly longitudinally outwardly from the endwall third portion 52 the distance $L_1$ for creating a flow reversing channel 56 from the throat 48 to the outlet 54 for reversing the direction of the coolant 20 to utilize centrifugal force for separating foreign objects therefrom. The size of the foreign objects separated from the coolant 20 depends upon the velocity of the coolant 20 in particular designs of the reactor assembly 10 and the radial spacing $R_1$ and longitudinal length $L_1$ of the separator member 50. For example, for relatively heavy foreign objects, the separator 50 may be relatively short (i.e. $L_1$) and spaced relatively far from the core shroud 16 (i.e. $R_1$) since such heavy foreign objects will be unable to turn with the coolant flow 20 and travel upward through the outlet 54. For relatively small foreign objects which more easily travel with the coolant 20, the separator member 50 may be placed closer to the core shroud 16 (i.e. $R_1$) and the separator 50 may be relatively long (i.e. $L_1$) for increasing the degree of centrifugal force imparted on the foreign object as it attempts to turn around the core shroud distal end 46.

In the preferred embodiment of the present invention, the separator member 50 is disposed parallel to the centerline axis 14, the core shroud 16, and the vessel sidewall 12a for turning the coolant 20 180° around the core shroud distal end 46 for obtaining a maximum amount of centrifugal force. Also in the preferred embodiment, the separator member distal end 50b extends longitudinally outwardly from the vessel endwall 12b at the third portion 52 at least as far as and preferably past the core shroud distal end 46 to a distance $L_2$. In this way, the outlet 54 is positioned at the distance $L_2$ longitudinally above the core shroud distal end 46 for additionally restraining foreign objects from turning around the core shroud distal end 46 and then turning around the separator distal end 50b and escaping the separator 26.

To further improve the efficiency of separation of the separator 26, the preferred embodiment also includes an annular lip 58 extending at an acute angle A from the separator member distal end 50b towards the core shroud distal end 46 for blocking passage thereover of smaller foreign objects entrained in the coolant 20. The angle of the lip 58 is preferably about 45° although it may have smaller values thereof, and larger values thereof up to about 90° maximum. The lip 58 will prevent any foreign objects which would be pushed by the coolant 20 upwardly along the separator member 50 from escaping therepast.

To yet further increase the efficiency of separation of the separator 26, an annular ramp 60, which is arcuate in the longitudinal plane, extends longitudinally outwardly from the vessel endwall 12b at the throat 48. The ramp 60 has an increasing thickness T in the direction of flow of the coolant 20 with a zero thickness upstream of the throat 48 and a maximum thickness at an aft end 60b disposed downstream from the throat 48. The ramp 60 is effective for additionally turning the coolant 20 through the throat 48 for providing additional centrifugal force on any foreign objects entrained therein for increasing the separation effectiveness of the separator 26.

The ramp aft end 60b is preferably disposed radially between the core shroud distal end 46 and the separator member 50, and, more particularly, is spaced radially outwardly from the separator member proximal end 50a at a distance $R_2$ to define an annular pocket 62 for retaining the foreign objects separated from the coolant 20, such as for example a bolt 64 shown in FIG. 3. The pocket 62 may be considered a dead zone in which the foreign objects will rest and not be buffeted by the coolant 20 or reentrained therein. In the preferred embodiment of the present invention, the ramp aft end 60b is disposed generally parallel to the centerline axis 14, although in alternate embodiments of the present invention it could be disposed at acute angles relative thereto for providing differently configured pockets 62 for retaining the foreign objects.

The foreign objects, such as the bolts 64, captured in the pockets 62 may remain retained therein during operation of the reactor assembly 10. However, during routine maintenance of the reactor assembly 10, the foreign objects may be removed from the pockets 62, if desired. This may be accomplished, for example, by providing an access port (not shown) through the pump deck 24 through which an operator may reach the foreign objects (e.g. bolts 64) by hand or by use of any conventional grabbing device.

Figure 4:
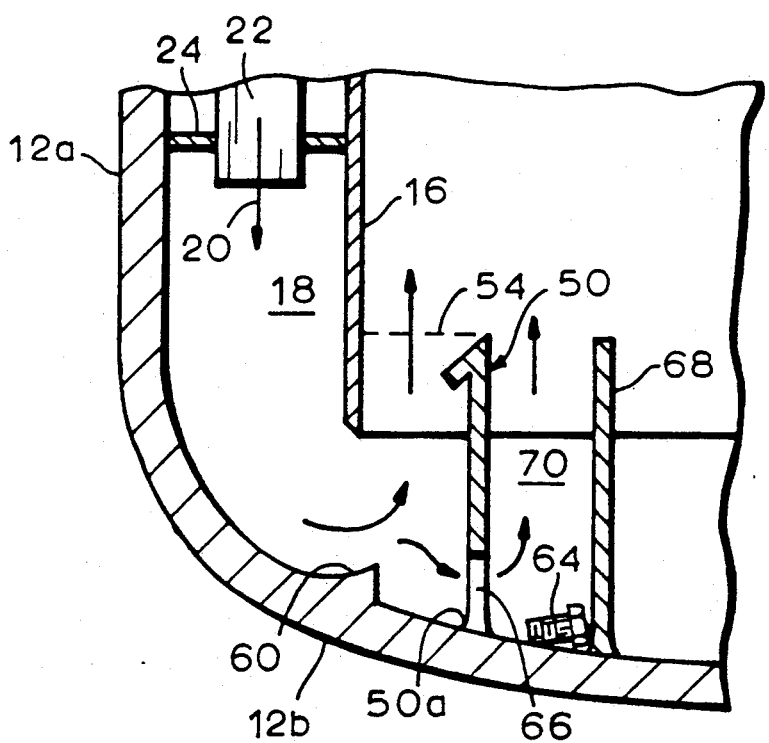
FIG. 4 is an enlarged, longitudinal sectional view, similar to the view illustrated in FIG. 3, of an alternate embodiment of the present invention.

Illustrated in FIG. 4 is an alternate embodiment of the invention illustrated in FIG. 3. In this embodiment, the separator member 50 includes a plurality of circumferentially spaced apertures 66 adjacent to the proximal end 50a thereof for channeling the foreign objects separated from the coolant 20. An annular, or cylindrical member 68 is spaced radially inwardly from the separator member 50 and coaxially with the centerline axis 14 to define an annular collection chamber 70 therebetween. Foreign objects, such as the bolts 64, are channeled through the apertures 66 and into the collection chamber 70 and are prevented from further movement therein by the cylindrical member 68. The apertures 66 are sized for allowing foreign objects of predetermined size to be carried therethrough and for allowing a predetermined flowrate of the coolant 20 to be channeled therethrough, which flowrate is selected for being incapable of carrying the foreign objects longitudinally outwardly from the collection chamber 70.

In both embodiments of the separator 26 disclosed above, gravity is effectively used for retaining the foreign objects either in the pockets 62 or in the collection chamber 70. In the embodiment illustrated in FIG. 3, the ramp aft wall 60b protects the pockets 62 from the coolant 20, and therefore prevents the foreign objects from being reentrained into the coolant 20 and possibly being carried out through the outlet 54. In the embodiment illustrated in FIG. 4, the separator member 50 itself, is effective for protecting the foreign objects retained in the collection chamber 70 from being reentrained by the main flow of the coolant 20 and channeled through the outlet 54 of the separator 26.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. For a nuclear reactor having an annular vessel sidewall spaced radially outwardly from an annular core shroud around a longitudinal centerline axis to define an annular flow passage for channeling a coolant in a direction parallel to said centerline axis, a foreign object separator comprising:
   a vessel endwall being arcuate in a longitudinal plane from a first portion joined to said vessel sidewall to a second portion spaced radially inwardly from said first portion for turning said coolant;
   said core shroud including an intermediate portion spaced radially inwardly from said endwall first portion to define an annular inlet for receiving said coolant from said flow passage, and a distal end spaced from said endwall second portion to define an annular throat;
   an annular separator member disposed coaxially about said centerline axis and having a proximal end fixedly joined to a third portion of said endwall spaced radially inwardly from said second portion, and a distal end spaced from said core shroud distal end to define an annular outlet, said separator member distal end being predeterminedly spaced from said proximal end for allowing said coolant from said throat to impinge against said separator member for further turning said coolant prior to discharge from said outlet; and
   said arcuate endwall and said separator member causing a centrifugal force to separate foreign objects of predetermined size from said coolant, said foreign objects being retained adjacent to said separator member proximal end.

2. A foreign object separator according to claim 1 wherein said separator member is disposed parallel to said centerline axis and said vessel sidewall for turning said coolant 180° around said core shroud distal end.

3. A foreign object separator according to claim 2 wherein said separator member distal end extends longitudinally outwardly from said vessel endwall past said core shroud distal end.

4. A foreign object separator according to claim 2 wherein said separator member further includes an annular lip extending at an acute angle from said distal end thereof toward said core shroud distal end for blocking passage thereover of said foreign objects entrained in said coolant.

5. A foreign object separator according to claim 2 further including an annular ramp extending longitudinally outwardly from said vessel endwall at said throat, said ramp having an increasing thickness in the direction of coolant flow.

6. A foreign object separator according to claim 5 wherein said ramp has an aft end of maximum thickness disposed radially between said core shroud distal end and said separator member.

7. A foreign object separator according to claim 5 wherein said ramp has an aft end of maximum thickness disposed generally parallel to said centerline axis.

8. A foreign object separator according to claim 7 wherein said ramp aft end is spaced radially outwardly from said separator member proximal end to define an annular pocket for retaining said foreign objects separated from said coolant.

9. A foreign object separator according to claim 2 further including an annular member spaced radially inwardly from said separator member and coaxially with said centerline axis to define a collection chamber, and said separator member includes a plurality of circumferentially spaced apertures adjacent to said proximal end for channeling said foreign objects into said collection chamber.

10. A foreign object separator according to claim 2 wherein:
   said separator member distal end extends longitudinally outwardly from said vessel endwall past said core shroud distal end;
   said separator member further includes an annular lip extending at an acute angle from said distal end thereof toward said core shroud distal end for blocking passage thereover of said foreign objects entrained in said coolant; and further including
   an annular ramp extending longitudinally outwardly from said vessel endwall at said throat, said ramp having an increasing thickness in the direction of coolant flow.

11. A foreign object separator according to claim 10 wherein said ramp has an aft end of maximum thickness disposed radially between said core shroud distal end and said separator member, and generally parallel to said centerline axis, said ramp aft end being spaced radially outwardly from said separator member proximal end to define an annular pocket for retaining said foreign objects separated from said coolant.

* * * * *